(12) United States Patent
Lee

(10) Patent No.: US 9,405,454 B2
(45) Date of Patent: Aug. 2, 2016

(54) METHOD AND SYSTEM FOR DISPLAYING SCREENS ON THE TOUCH SCREEN OF A MOBILE DEVICE

(75) Inventor: Seung Myung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 400 days.

(21) Appl. No.: 13/314,306

(22) Filed: Dec. 8, 2011

(65) Prior Publication Data

US 2012/0147057 A1 Jun. 14, 2012

(30) Foreign Application Priority Data

Dec. 10, 2010 (KR) .................. 10-2010-0125920

(51) Int. Cl.
G06F 3/041 (2006.01)
G06F 3/0486 (2013.01)
G06F 3/0482 (2013.01)
G06F 3/0488 (2013.01)
G06F 3/0481 (2013.01)

(52) U.S. Cl.
CPC ............ *G06F 3/0486* (2013.01); *G06F 3/0482* (2013.01); *G06F 3/04817* (2013.01); *G06F 3/04883* (2013.01)

(58) Field of Classification Search
None
See application file for complete search history.

(56) References Cited

U.S. PATENT DOCUMENTS

| 5,751,283 A * | 5/1998 | Smith ........................... 715/798 |
| 6,915,490 B1 * | 7/2005 | Ewing ........................... 715/794 |
| 2002/0080180 A1 | 6/2002 | Mander et al. |
| 2003/0228909 A1 * | 12/2003 | Tanaka et al. .................. 463/42 |
| 2005/0066292 A1 * | 3/2005 | Harrington .................. 715/835 |
| 2008/0120571 A1 | 5/2008 | Chang et al. |
| 2008/0168384 A1 * | 7/2008 | Platzer ............... G06F 3/04845 715/784 |
| 2008/0307335 A1 | 12/2008 | Chaudhri et al. |
| 2009/0150775 A1 | 6/2009 | Miyazaki et al. |
| 2009/0293007 A1 * | 11/2009 | Duarte ................. G06F 3/0481 715/767 |
| 2010/0007623 A1 | 1/2010 | Kaneko et al. |
| 2010/0026647 A1 | 2/2010 | Abe et al. |

(Continued)

FOREIGN PATENT DOCUMENTS

| CN | 101223496 A | 7/2008 |
| CN | 101452366 A | 6/2009 |

(Continued)

OTHER PUBLICATIONS

Hsu et al, "Phorigami: A Photo Browser Based on Meta-categorization and Origami Visualization", HCII 2009, LNCS 5611, pp. 801-810, ed. J.A. Jacko, Springer-Verlag, 2009.*

(Continued)

*Primary Examiner* — Ulka Chauhan
*Assistant Examiner* — Patrick F Valdez
(74) *Attorney, Agent, or Firm* — Cha & Reiter, LLC.

(57) ABSTRACT

A method for displaying screens on the touch screen of a mobile device includes displaying, on a first screen, at least two or more object items and an object item group within which at least two or more object items are arranged at a first set interval and rearranging and displaying the object items included in the object item group at a second set interval when an input is received that displays the object item group. When a touch or drag gesture is applied to the group of object items displayed at the first set interval, the object items are then displayed at a second set interval on the screen of a mobile device.

17 Claims, 15 Drawing Sheets

(56) References Cited

U.S. PATENT DOCUMENTS

| | | | |
|---|---|---|---|
| 2010/0083111 A1* | 4/2010 | de los Reyes | 715/702 |
| 2010/0095240 A1* | 4/2010 | Shiplacoff | G06F 3/0483 715/784 |
| 2010/0153844 A1* | 6/2010 | Hwang et al. | 715/702 |
| 2010/0169774 A1* | 7/2010 | Oda et al. | 715/702 |
| 2010/0199199 A1* | 8/2010 | Kumar | G06F 3/0481 715/765 |
| 2011/0009103 A1* | 1/2011 | Do | 455/414.3 |
| 2011/0055773 A1* | 3/2011 | Agarawala | G06F 3/016 715/863 |
| 2011/0099524 A1* | 4/2011 | Jeong et al. | 715/843 |
| 2011/0193785 A1* | 8/2011 | Russell et al. | 345/173 |
| 2011/0208732 A1* | 8/2011 | Melton | G06F 17/30896 707/728 |
| 2012/0084689 A1* | 4/2012 | Ledet et al. | 715/769 |
| 2012/0206484 A1* | 8/2012 | Hauschild et al. | 345/629 |

FOREIGN PATENT DOCUMENTS

| | | |
|---|---|---|
| CN | 101772756 A | 7/2010 |
| EP | 0 955 591 A2 | 11/1999 |
| EP | 2 068 237 A2 | 6/2009 |
| EP | 2 158 951 A2 | 3/2010 |
| JP | 2004-348704 A | 12/2004 |
| JP | 2006-134330 A | 5/2006 |
| JP | 2010-40029 A | 2/2010 |
| JP | 2010-238098 A | 10/2010 |
| KR | 10-0715832 B1 | 5/2007 |
| KR | 10-2007-0107892 A | 11/2007 |
| KR | 10-2009-0113622 A | 11/2009 |
| KR | 10-2009-0129041 A | 12/2009 |
| KR | 10-2010-0010302 A | 2/2010 |
| KR | 10-2010-0038651 A | 4/2010 |

OTHER PUBLICATIONS

Mander et al, "A 'Pile' Metaphor for Supporting Casual Organization of Information", ACM CHI'92, pp. 627-634, 1992.*

Agarawala et al, "Keepin' It Real: Pushing the Desktop Metaphor with Physics, Piles and the Pen", ACM CHI 2006 Proceedings, pp. 1283-1292.*

Hsu et al., "Phorigami: visualization of digital photo collections by origami arts", DeSForM'09, the fifth international Workshop of Design and Semantics of Form and Movement, Taipei, Taiwan, 2009.*

Leithinger et al, "Improving Menu Interaction for Cluttered Tabletop Setups with User-Drawn Path Menus", Second Annual IEEE Intl Workshop on Horizontal Interactive Human-Computer Systems, 2007.* iPhone 4 & iOS 4 Main Features All Catalog, iPhone People Summer-Autumn Japan, ASCII Media Works, Jul. 29, 2010, pp. 19.

* cited by examiner

FIG. 11
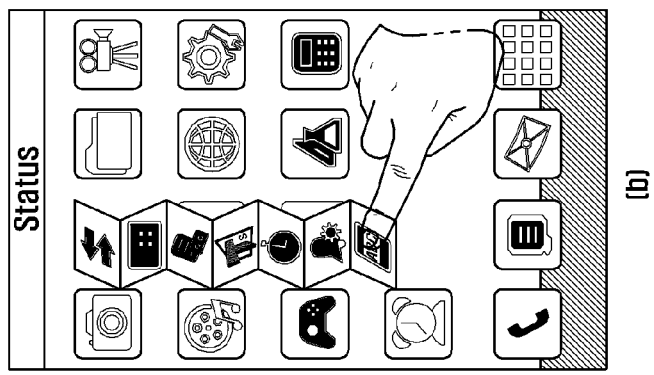
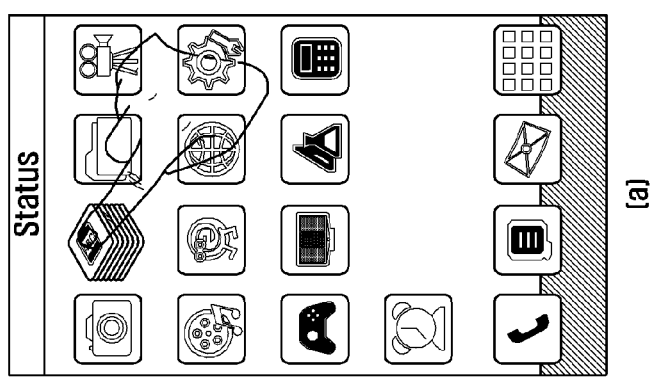

METHOD AND SYSTEM FOR DISPLAYING SCREENS ON THE TOUCH SCREEN OF A MOBILE DEVICE

CLAIM OF PRIORITY

This application claims priority from an application entitled "Injection Molded Case Having Antenna Pattern and Manufacturing Method Thereof" filed in the Korean Intellectual Property Office on Dec. 10, 2010, and assigned Serial No. 10-2010-0125920, the contents of which are hereby incorporated by reference in its entirety.

BACKGROUND OF THE INVENTION

1. Field of the Invention

This invention relates to mobile devices with touch screens. More particularly, the invention relates to a mobile device, display screen and method of displaying by which a touch or a drag applied to a group of object items displayed on a screen of a mobile device at a first set interval causes the object items to be displayed at a second set interval on the screen of the mobile device.

2. Description of the Related Art

Mobile devices have developed to serve as multimedia devices, and equipped with various types of additional services, such as an electronic note function, a game function, a schedule management function, etc., therefore. User interfaces have also developed to allow users to easily use and manage these services. For example, a mobile device includes a user interface that displays application icons or folder icons on the main screen or a home screen on the touch screen.

To cover the areas to which applications are applied, developers have developed corresponding applications that are specially designed to be installed to mobile devices. This results in numbers of applications which increase dramatically over time. Users download required applications to their mobile devices and arrange icons corresponding to the applications on the main screen or home screen, etc. But as the number of icons that correspond to applications continuously increases, arranging them on the screen proves to be a daunting task as the size of mobile device screens is limited.

Conventional screen display systems also are disadvantageous in that they fail to enable users to identify the contents of an application corresponding to an icon before they touch the icon and thereby cause the related application to be executed. In particular, when the icon is a folder icon, users cannot identify the contents of applications or subfolders contained in the folder.

SUMMARY OF THE INVENTION

The present invention overcomes the shortcomings of the prior art by providing a system to effectively manage icons corresponding to applications in mobile devices such as smartphones, etc.

The invention provides a display method and system by which a number of object items selected by the user are formed as a group of object items arranged by a first set interval, and displays the group on a screen of a mobile device.

The invention further provides a method and system that displays, when a touch or a drag is made on a group of object items displayed at a first set interval, the object items at a second set interval on the screen of a mobile device.

In an embodiment, the invention provides a method for displaying screens on a touch screen of a mobile device, including displaying on a first screen, at least two or more object items and an object item group within which at least two or more object items are arranged at a first set interval; and rearranging and displaying the object items included in the group at a second set interval when an input is received that displays the object item group.

In another embodiment, the invention provides a system for displaying screens on a touch screen of a mobile device, including a touch screen and a controller. The touch screen displays, on a first screen, at least two or more object items and an object item group within which at least two or more object items are arranged at a first set interval. The controller rearranges and displays the object items included in the group at a second set interval when an input is received that displays the object item group.

BRIEF DESCRIPTION OF THE DRAWINGS

The features and advantages of the invention will become more apparent from the following detailed description in conjunction with the accompanying drawings, in which:

FIGS. 10A, 10B, 11A, 11B, 12A and 12B illustrate screens that describe step S935 of FIG. 9.

DETAILED DESCRIPTION OF THE INVENTION

Hereinafter, exemplary embodiments of the invention are described in detail with reference to the accompanying drawings. The same reference numbers are used throughout the drawings to refer to the same or similar parts. For the purposes of clarity and simplicity, detailed descriptions of well-known functions and structures incorporated herein may be omitted to avoid obscuring the subject matter of the invention.

The term 'object item' refers to a unit to identify or execute an application, a folder, a widget, etc. An object item can be displayed in a certain shape, form, color or a combination thereof.

The term 'object item group' refers to a group unit that includes at least two or more object items arranged at a certain interval. An object item group can be displayed in the shape of a pile of object items.

Figure 1:
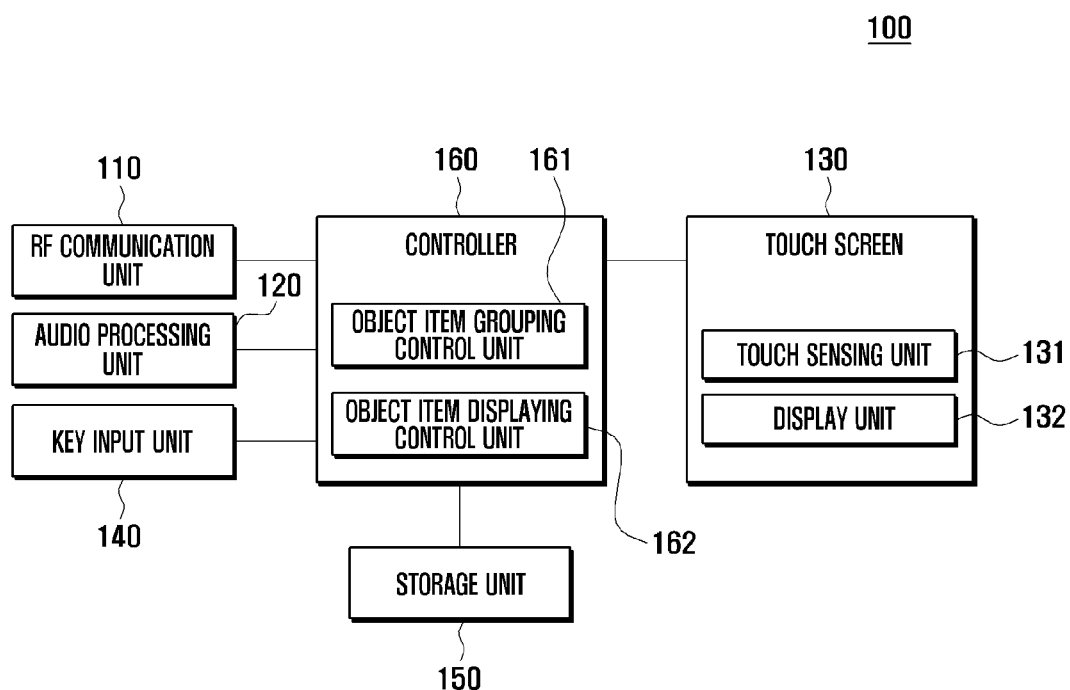
FIG. 1 illustrates a schematic block diagram of a mobile device 100 according to an embodiment of the invention.

FIG. 1 illustrates a schematic block diagram of a mobile device 100 according to an embodiment of the invention.

As shown in FIG. 1, the mobile device 100 includes an RF communication unit 110, an audio processing unit 120, a touch screen 130, a key input unit 140, a storage unit 150, and a controller 160.

The RF communication unit 110 transmits/receives data to/from external systems via wireless communication. The RF communication unit 110 includes an RF transmitter for amplifying and up-converting the frequency of signals to be transmitted and an RF receiver for low-noise amplifying received RF signals and down-converting the frequency of the received RF signals. The RF communication unit 110 receives data via an RF channel and outputs it to the controller 160. The RF communication unit 110 also transmits data, output from the controller 160, via the RF channel.

The audio processing unit 120 includes coders and decoders (CODECs). The CODECs are comprised of a data CODEC for processing packet data, etc., and an audio CODEC for processing audio signals, such as voice signals, etc. The audio CODEC converts digital audio signals into analog audio signals and outputs them via a speaker (SPK). The audio CODEC also converts analog audio signals, received via a microphone (MIC), into digital audio signals.

The touch screen 130 includes a touch sensing unit 131 and a display unit 132.

The touch sensing unit 131 senses a user's input touches. The touch sensing unit 131 may be implemented with various types of touch sensors, for example, a capacitive overlay type sensor, a resistive overlay type sensor, an infrared beam type sensor, a pressure sensor, etc. It should be understood that the invention is not limited to the sensors listed above. That is, the touch sensing unit 131 can be implemented with all types of sensors that can sense touch or contact, without limitation. The touch sensing unit 131 senses a user's touch applied to the touch screen 130, generates a touch sensed signal, and outputs it to the controller 160. The touch sensed signal includes the coordinate data of the user's input touch. When the user gestures a touch location movement, the touch sensing unit 131 creates a touch sensed signal including the coordinate data of the path of the touch location movement, and transfers it to the controller 160.

In an embodiment of the invention, the touch sensing unit 131 senses a user's touch to expand and display an object item group. Examples of the user's touch are a touch, a multi touch, a drag, etc.

The display unit 132 may be implemented with a Liquid Crystal Display (LCD), an Organic Light Emitting Diode (OLED), an Active Matrix Organic Light Emitting Diodes (AMOLED), or the like. The display unit 132 displays menus, input data, function-setting information, and additional information of the mobile device 100. For example, the display unit 132 displays a booting screen, an idle screen, a call screen, and application executing screens of the mobile device 100.

Although in the embodiment is described the mobile device 100 is equipped with a touch screen, it should be understood that the invention is not limited thereto. That is, the invention also may be applied to mobile devices without a touch screen. Moreover, when the application is applied to a mobile device with a touch screen, the embodiment shown in FIG. 1 may be modified so that the touch screen 130 serves as only a display unit 132.

The key input unit 140 receives a user's key operations to control the mobile device 100, creates the operation signals and transfers them to the controller 160. The key input unit 140 includes a keypad with alphanumeric keys and direction keys. The key input unit 140 may be installed, as a function key, to one side of the mobile device 100. When the mobile device 100 is operated only by a touch screen 130, the mobile device 100, the key input unit 140 need not be included.

The storage unit 150 stores programs required to operate the mobile device 100 and data generated when the programs are executed. The storage unit 150 is comprised of a program storage area and a data storage area. The program storage area stores a program for controlling the entire operation of the mobile device 100, an operating system (OS) for booting the mobile device 100, an application program for reproducing multimedia contents, and application programs that are necessary for other optional functions of the mobile device 100. Such application programs might include a camera function, an audio playback function, an image or video playback function, etc. The data storage area stores data that is generated when the mobile device 100 is used, for example, data comprising images, video images, a phone book, audio data, etc.

The controller 160 controls the entire operation of the components in the mobile device 100. When the mobile device 100 displays a screen for displaying object items, for example, the main screen, the home screen, etc., the controller 160 performs a control operation to display at least one or more object items on a first screen. In that case, the object items are arranged within a certain interval, between the object items, on the first screen.

Alternatively, the controller 160 configures a number of object items selected by the user as one group of object items arranged at a first set interval, and then displays the group on the screen. When the controller 160 senses a touch or a drag applied to the group of object items displayed at the first set interval, it automatically displays the object items in the group as a second set interval. To this end, the controller 160 includes an object item grouping control unit 161 and an object item displaying control unit 162.

The object item grouping control unit 161 configures two or more object items arranged on the first screen as a group of object items, i.e., an object item group. When the user touches or drags an object item and drops it on another object item, the object item grouping control unit 161 creates an object item group including arranging the two object items at a first set interval. After that, the object item grouping control unit 161 displays the created object item group on the display unit 132. In an embodiment, the object item group is displayed such that at least two or more object items are piled up at the first set interval.

The object item displaying control unit 162 serves to expand and display the group of object items. When the object item displaying control unit 162 receives a user's input for expanding an object item group, it separates the items arranged at the first set interval into a second set interval and displays them on the screen.

In an embodiment, the object item displaying control unit 162 receives a user's input applied to the object item group and displays at least two or more object items in the group on a second screen. On the second screen, the object items are spaced apart at the second set interval and displayed on the same layer.

Alternatively, the object item displaying control unit 162 receives a user's drag applied to the object item group and in response, expands at least two or more object items in the group in a certain degree of tilt on the screen. When the object item displaying control unit 162 receives an instruction for executing one of the expanded object items, it executes the corresponding object item.

Although the controller 160, the object item grouping control unit 161 and the object item displaying control unit 162 are described herein as comprising separate blocks, and performing different functions, the description is for exemplary purposes only such that they are not limited thereto. For example, the controller 160 can perform part of the functions of the object item grouping control unit 161 and the object item displaying control unit 162 without deviating from the scope and spirit of the invention.

Figure 2:
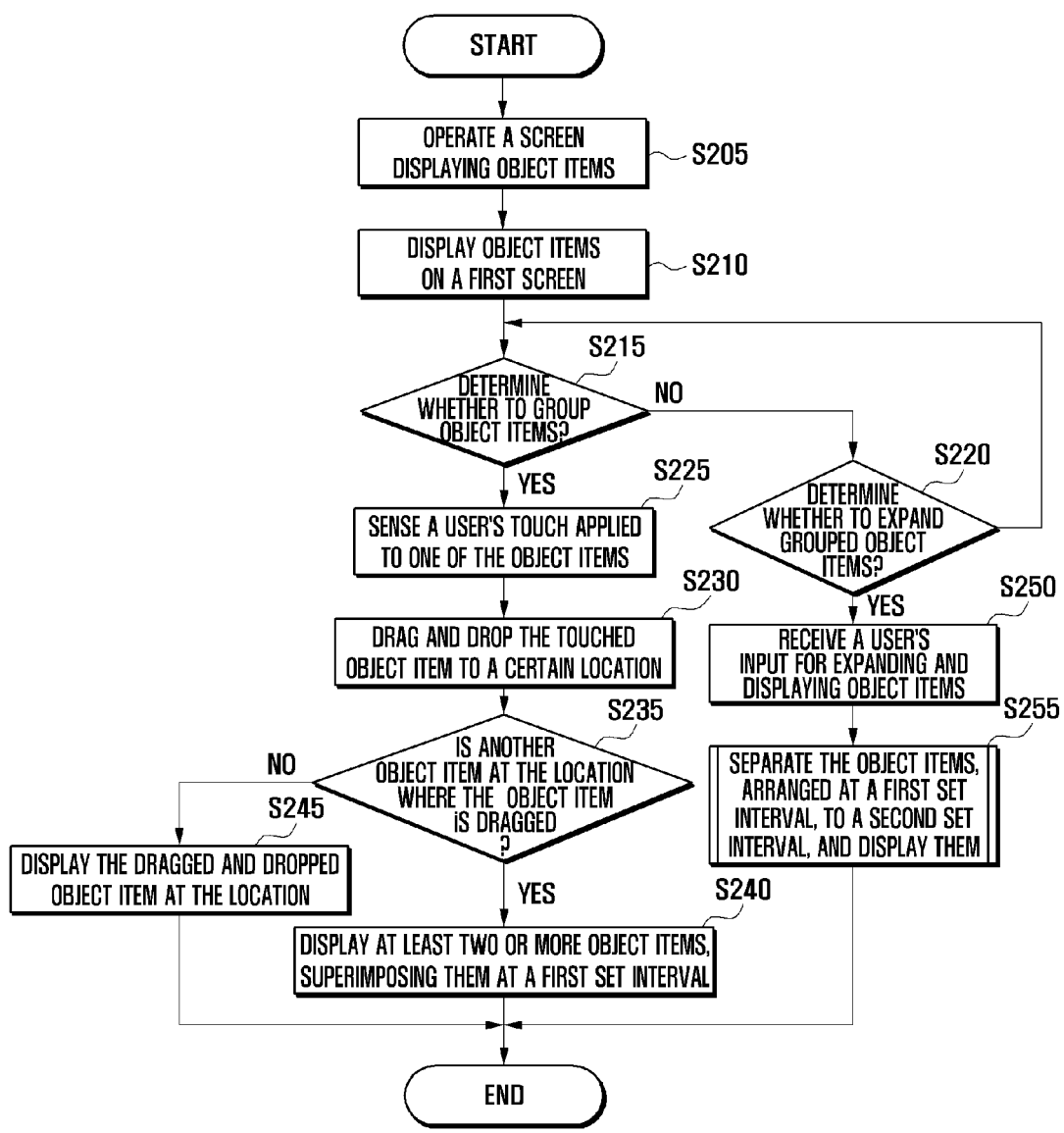
FIG. 2 is a flowchart that describes a method for creating a group of object items and displaying the created group in an expanding manner, according to an embodiment of the invention.

FIG. 2 is a flowchart that describes a method for creating a group of object items and displaying the created group in an expanding manner, according to an embodiment of the invention. The method will be described, referring to FIGS. 4 to 6A and 6B.

The controller 160 receives a user's input to display object items, for example, to release a locked screen. The controller 160 operates a screen displaying object items (S205). Examples of the object item display screen are a main screen, a home screen, etc. The controller 160 displays object items on a first screen (S210), for example, on first screen 405 as shown in FIG. 4.

Figure 4:
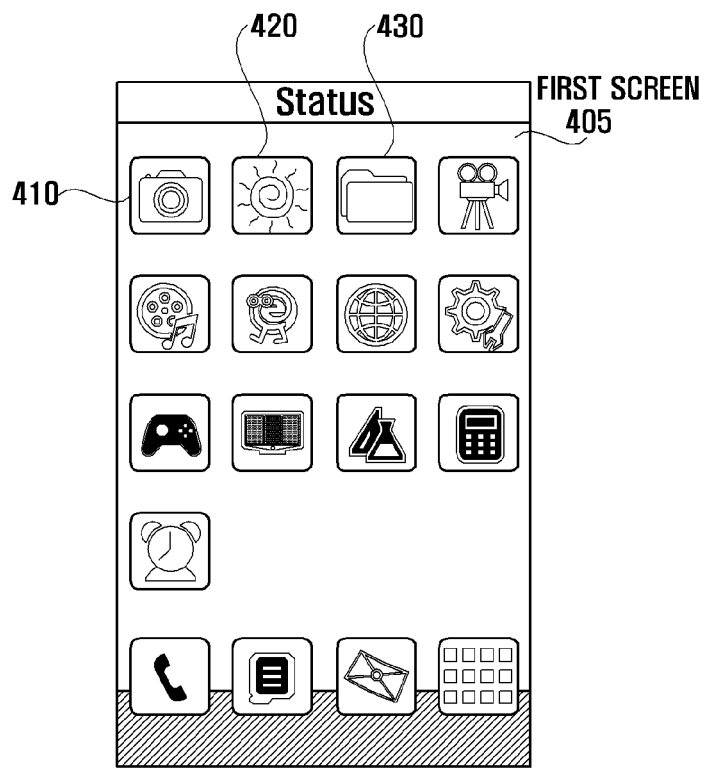
FIG. 4 illustrates an example of a first screen showing object items.

As shown in FIG. 4, at least one or more object items 410, 420 and 430 are displayed on the first screen 405. For example, object item 410 is a camera application; object item 420 is a weather application; and object 430 is a new folder. These object items are arranged in the matrix form, maintaining a certain interval between them. However, it should be understood that this arrangement is for exemplary purposes only and that many modifications from the arrangement made without deviating from the scope and spirit of the invention.

Referring back to the flowchart of FIG. 2, after displaying object items at step S210, the method may group the object items or expand the grouped object items.

In order to group the object items, the controller 160 performs steps S215 to S225. The controller 160 senses a user's touch applied to one of the object items displayed on the first screen 405 at step S225. The controller 160 senses a user's touch to drag and drop the touched object item to a certain location (S230).

The controller 160 determines whether there is another object item at the location where the touched object item is dragged and dropped (S235). When the controller 160 ascertains that there is not another object item at the location where the touched object item is dragged and dropped (at step S235), it displays the dragged and dropped object item at the location (245).

On the contrary, when the controller 160 ascertains that there is another object item at the location where the touched object item is dragged and dropped (at step S235), it creates an object item group where at least two or more object items are arranged at a first set interval (S240). After that, the controller 160 displays the created object item group at the location on the first screen 405. In an embodiment, the object item group is displayed as at least two or more object items are piled up at a first set interval.

Figure 5:
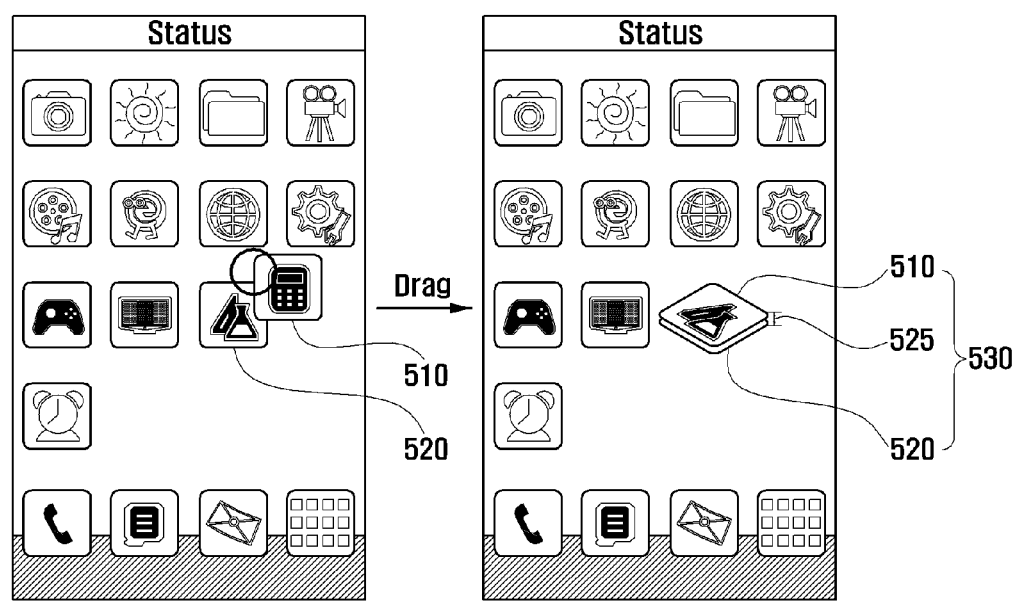
FIG. 5 illustrates screens that describe steps S225 to S240 in the flowchart shown in FIG. 2.

Screens corresponding to steps 225 to 240 are displayed in FIG. 5. As shown in FIG. 5, the user touches and drags an object item 510 and drops it at a certain location. When there is another object item 520 at the location where the touched, dragged object item is dropped, the controller 160 creates an object item group 530. The created object item group 530 arranges the two object items 510 and 520 at a first set interval 525. As shown in FIG. 5, the object item group 525 is displayed as at least two or more object items in a pile at a first set interval.

Figure 3:
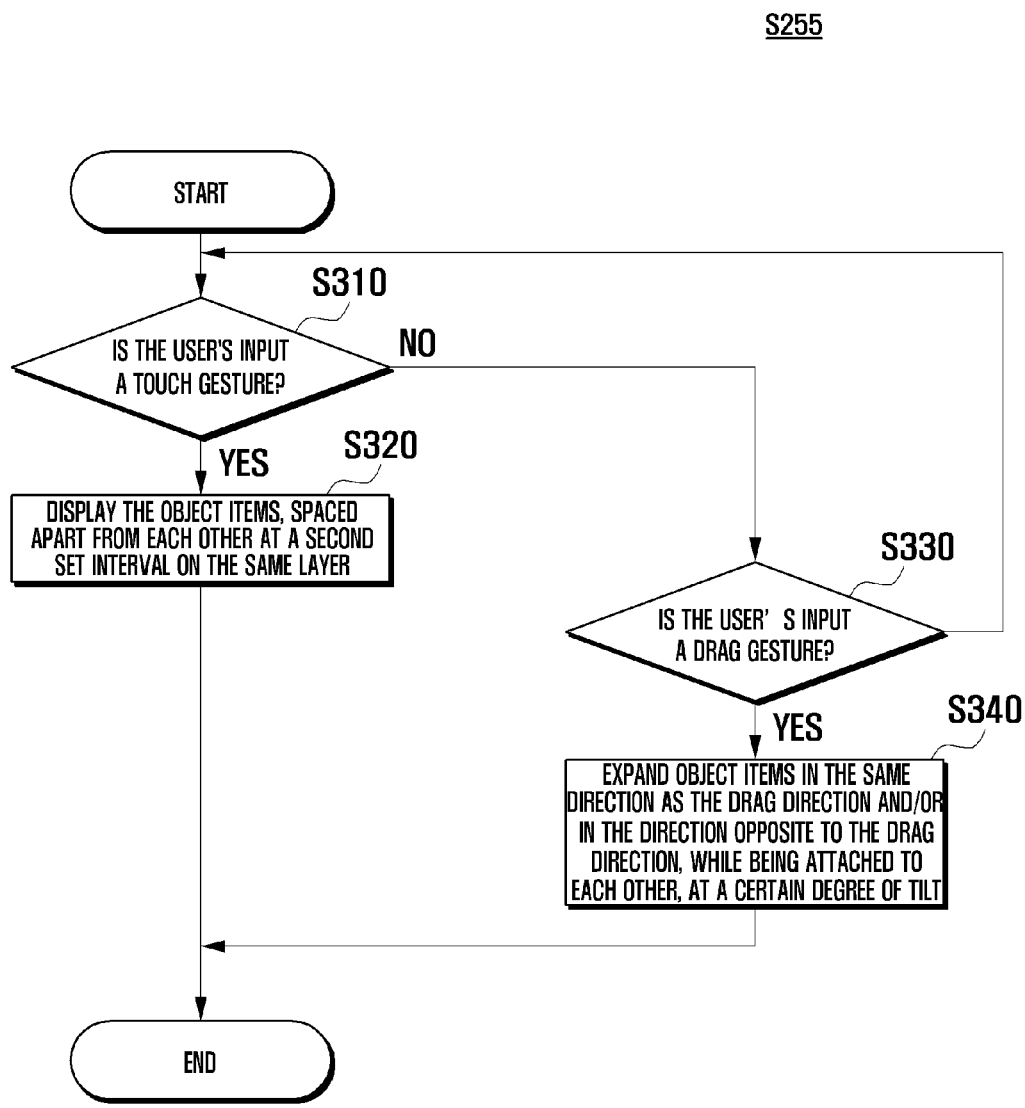
FIG. 3 is a detailed flowchart that describes step S255 of FIG. 2 where object items are displaying by being spaced apart with a second set interval.

Referring back to FIG. 2, in order to expand the grouped object items, the controller 160 performs method steps S220 to S250. That is, the controller 160 receives a user's input for expanding and displaying object items (S250). The controller 160 then separates the object items, arranged at the first set interval, to a second set interval and displays them (S255). Step S255, as described in detail in FIG. 3, displays object items in a spaced apart arrangement within a second set interval.

In step S255, the controller 160 determines whether the user's input, received at step S250, is a touch gesture (S310). If the controller 160 ascertains that the user's input is a touch gesture at step S310, it displays the object items in the object item group in a spaced apart relationship from each other at a second set interval on the same layer on a second screen (S320). In an embodiment, the first and second set intervals are different values from each other.

If in step S310 the controller 160 ascertains that the user's input is not a touch gesture, it then determines whether the user's input is a drag gesture (S330).

When the controller 160 ascertains that the user's input is a drag gesture (at step S330), it expands the at least two or more object items included in the object item group to be spaced apart from each other at a second set interval (i.e., a certain degree of tilt) (S340). The direction of expanding the object items may be the same direction as the drag direction and/or the direction opposite to the drag direction. That is, the object items are expanded in the same direction as the drag direction. Alternatively, the object items are expanded in all directions opposite to the drag direction.

In an embodiment, the object items are successively arranged and expanded, while being attached, at a certain degree of tilt. That is, two adjacent object items are arranged in such a manner that the bottom surface of the upper object item contacts the upper surface of the lower object item. Such arrangement manner is identically applied to a number of object items when they are arranged in an object item group.

In the following description, the process of expanding object items is described with reference to FIGS. 6A and 6B.

Figure 6A:
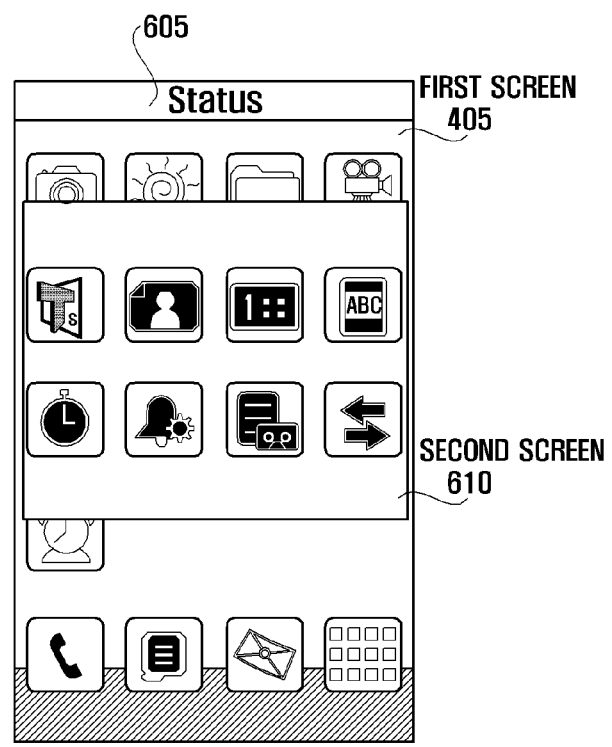
FIGS. 6A and 6B illustrate examples of a screen that shows a group of object items in an expanding manner.

FIG. 6A illustrates an example of a screen representative of a process of expanding object items via step S320.

As shown in FIG. 6A, when the controller 160 senses a user's touch applied to the object item group 530 (FIG. 5), it controls the display unit 132 to display a second screen 610. In an embodiment, the second screen 610 is implemented with a pop-up form. The object items included in the object item group 530 are spaced apart from each other at a second set interval on the same layer on the second screen 610. As shown in FIG. 6A, the object items are arranged into regions in a grid form, respectively, allocated in rectangles.

Figure 6B:
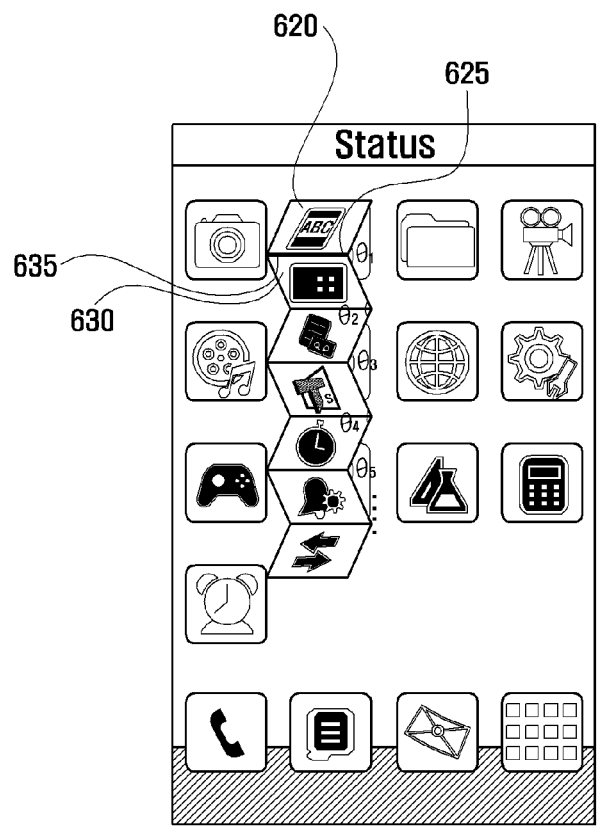

FIG. 6B illustrates an example of a screen that describes a process of expanding object items via step S340.

As shown in FIG. 6B, when the controller 160 senses a user's drag applied to the object item group 530 (FIG. 5), it expands at least two or more object items included in the group 530 at angles (or intervals) (e.g., $\ominus_1$, $\ominus_2$, $\ominus_3$, $\ominus_4$, $\ominus_5$, ... ) with respect to each other. In the embodiment shown, the angles are all the same.

In more detail, the FIG. 6B object items, are successively arranged and expanded, while being attached, at a certain degree of tilt. That is, two adjacent object items are arranged in such a manner that the bottom side 625 of the upper object item 620 connects to the top side 635 of the lower object item 630.

Two alternative embodiments of the method for expanding an object item group now will be explained via embodiments 1 and 2. In embodiment 1, at least two or more object items included in an object item group are displayed on a second screen in an expanding manner. In embodiment 2, at least two or more object items included in an object item group are expanded at a certain degree of tilt, respectively.

Figure 7:
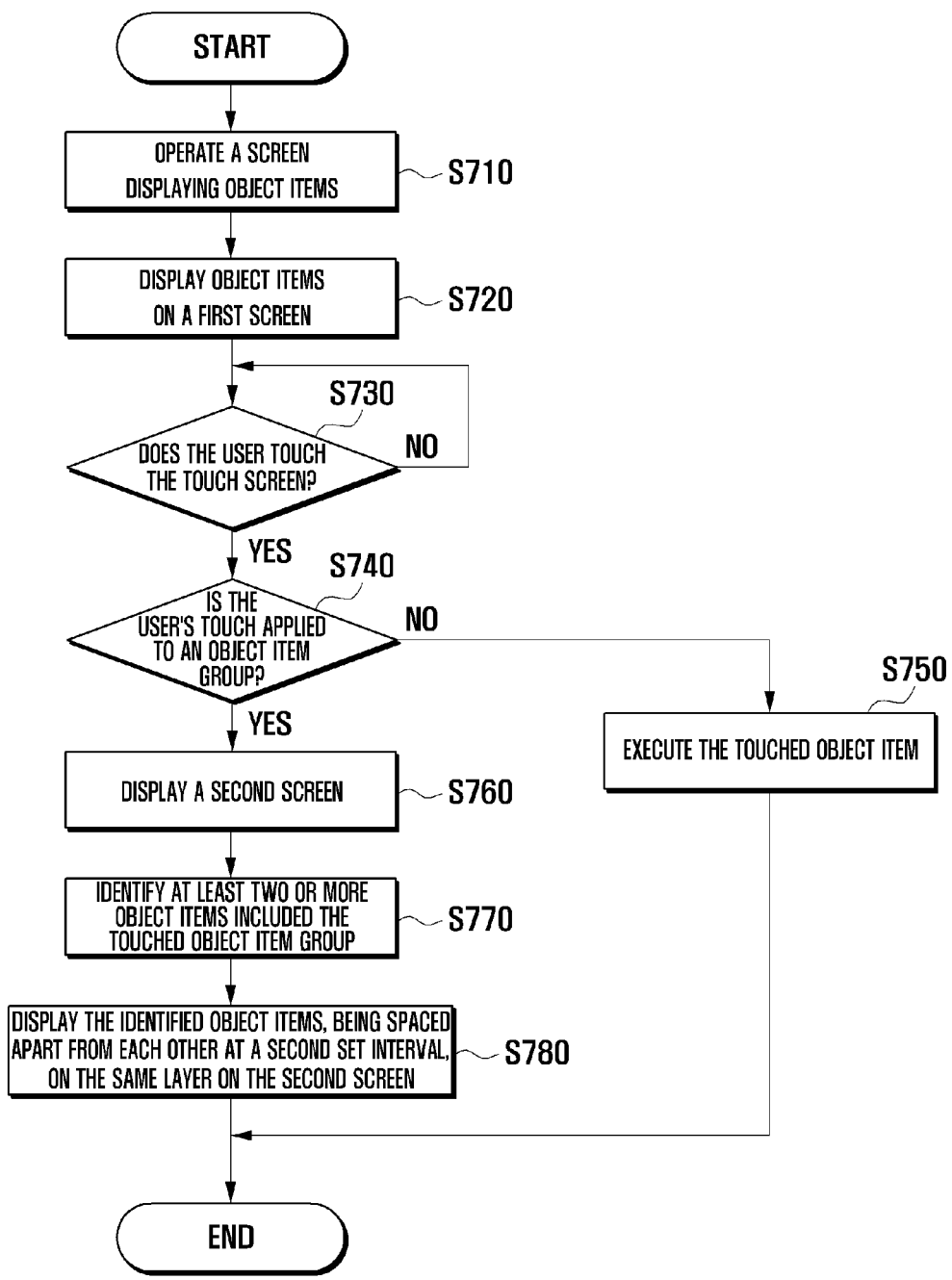
FIG. 7 is a flowchart that describes a method for displaying a group of object items on a second screen in an expanding manner, according to a first embodiment of the invention.
Figure 8:
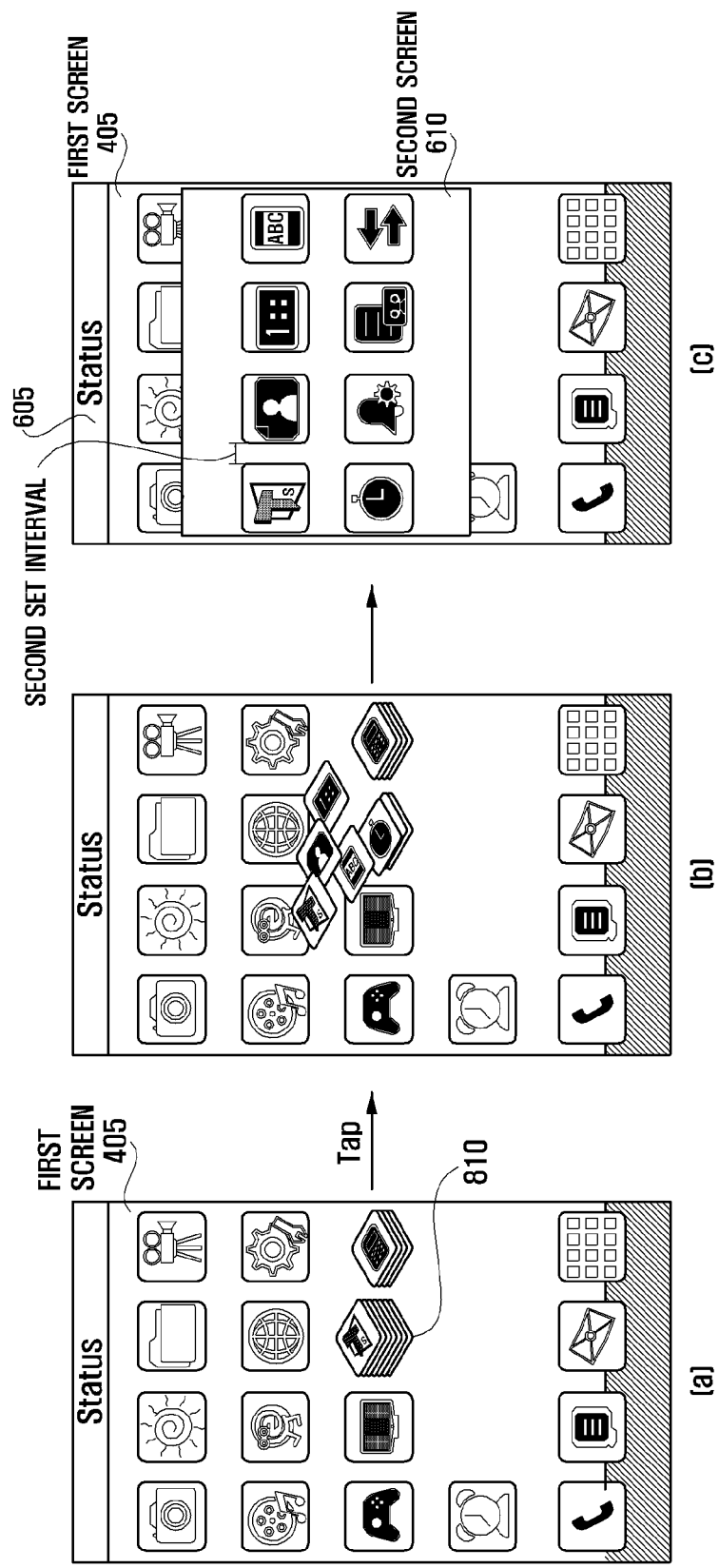
FIGS. 8A, 8B and 8C illustrate screens that describe the method shown in FIG. 7.

FIG. 7 is a flowchart that describes the method for displaying a group of object items on a second screen in an expanding manner, where FIGS. 8A to 8C illustrate screens that are displayed according to the method of FIG. 7.

As shown in FIG. 7, the controller 160 operates a screen displaying object items (S710). Examples of the object item display screen are a main screen, a home screen, etc., without limitation. The controller 160 displays at least two or more object items on a first screen (405) on the screen (S720), as shown in FIG. 8A.

The controller 160 determines whether the user touches the touch screen 130 (S730). If the controller 160 ascertains that the user taps the touch screen 130 at step S730, it determines whether the user's touch is applied to an object item group or one of the object items (S740).

If the controller 160 ascertains that the user's touch is applied to one of the object items at step S740, it executes the touched object item (S750). For example, when the touched object item is an application, the application is launched (executed). When the touched object item is a folder, the controller 160 displays files or sub folders, etc., in the folder.

Alternatively, if the controller 160 ascertains that the user's touch is applied to an object item group at step S740, it displays a second screen (S760). The controller 160 identifies at least two or more object items included in the touched object item group (S770). After that, the controller 160 displays the identified object items on the second screen (S780).

When the controller 160 moves the object items from the first screen to the second screen and displays them on the second screen, the object items piled up on the first screen are moved in order from the top, which is illustrated in FIG. 8B.

After that, the controller 160 rearranges the object items, arranged at a first set interval in the object item group, to a second set interval on the second screen, as illustrated in FIG. 8C. More specifically, as shown in FIG. 8C, the object items are arranged into regions in a matrix form, respectively, allocated in rectangles.

Figure 9:
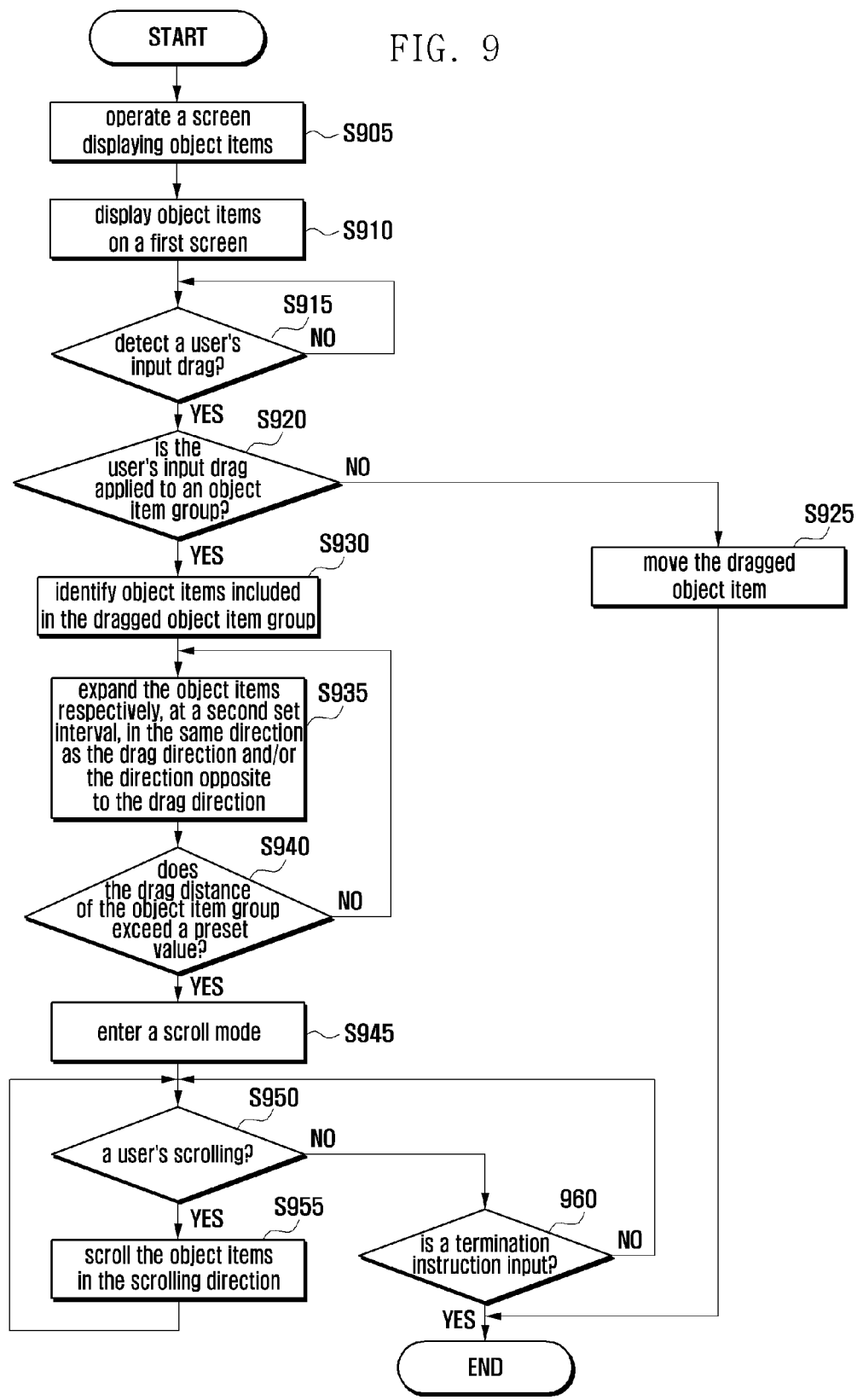
FIG. 9 is a flowchart that describes a method for expanding a group of object items at a certain degree of tilt and executing one of the object items, according to a second embodiment of the invention.
Figure 10:
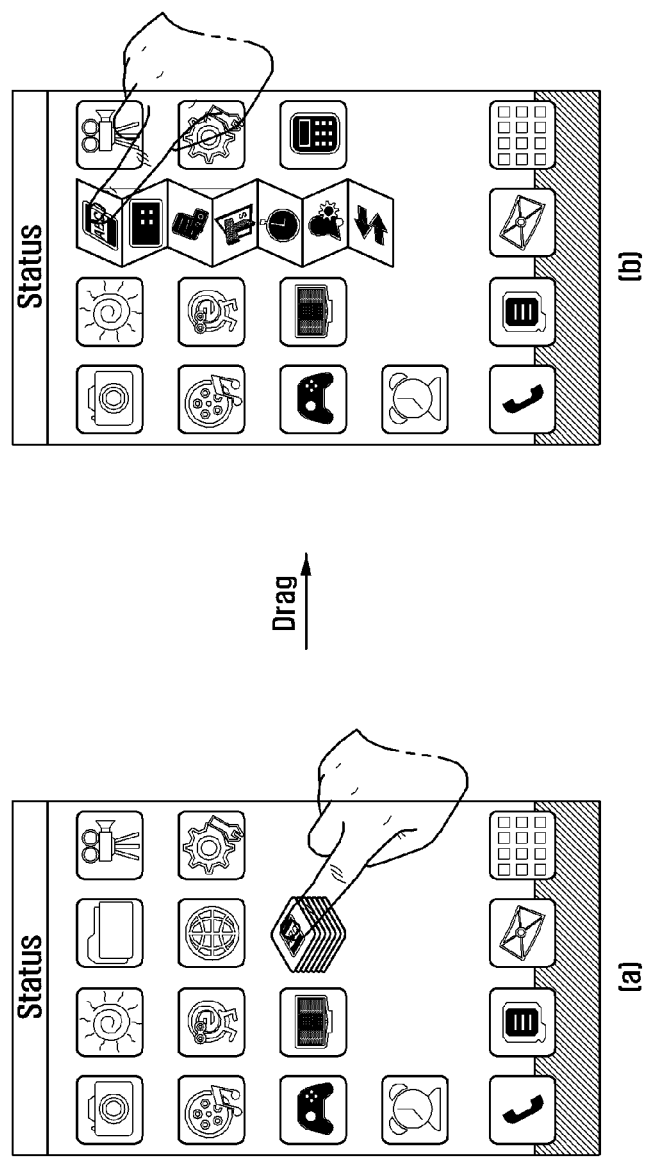
Figure 12:
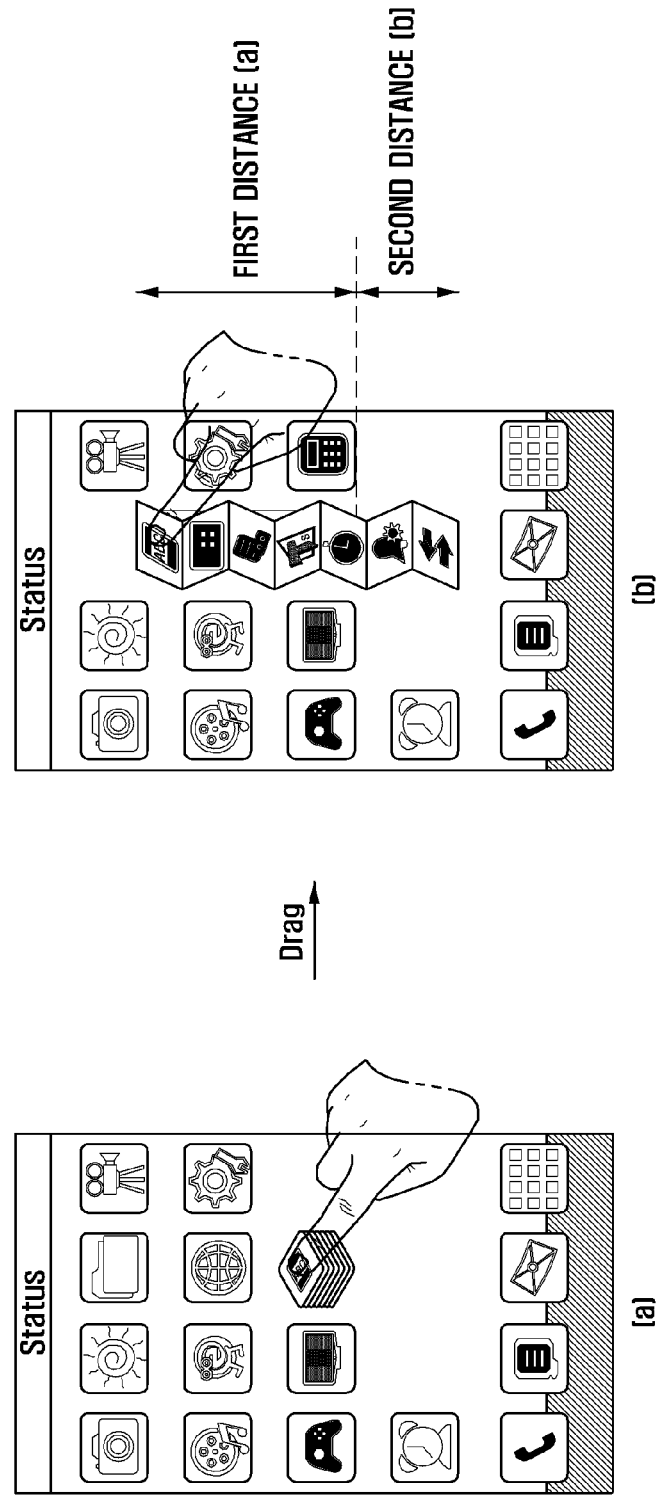
Figure 13:
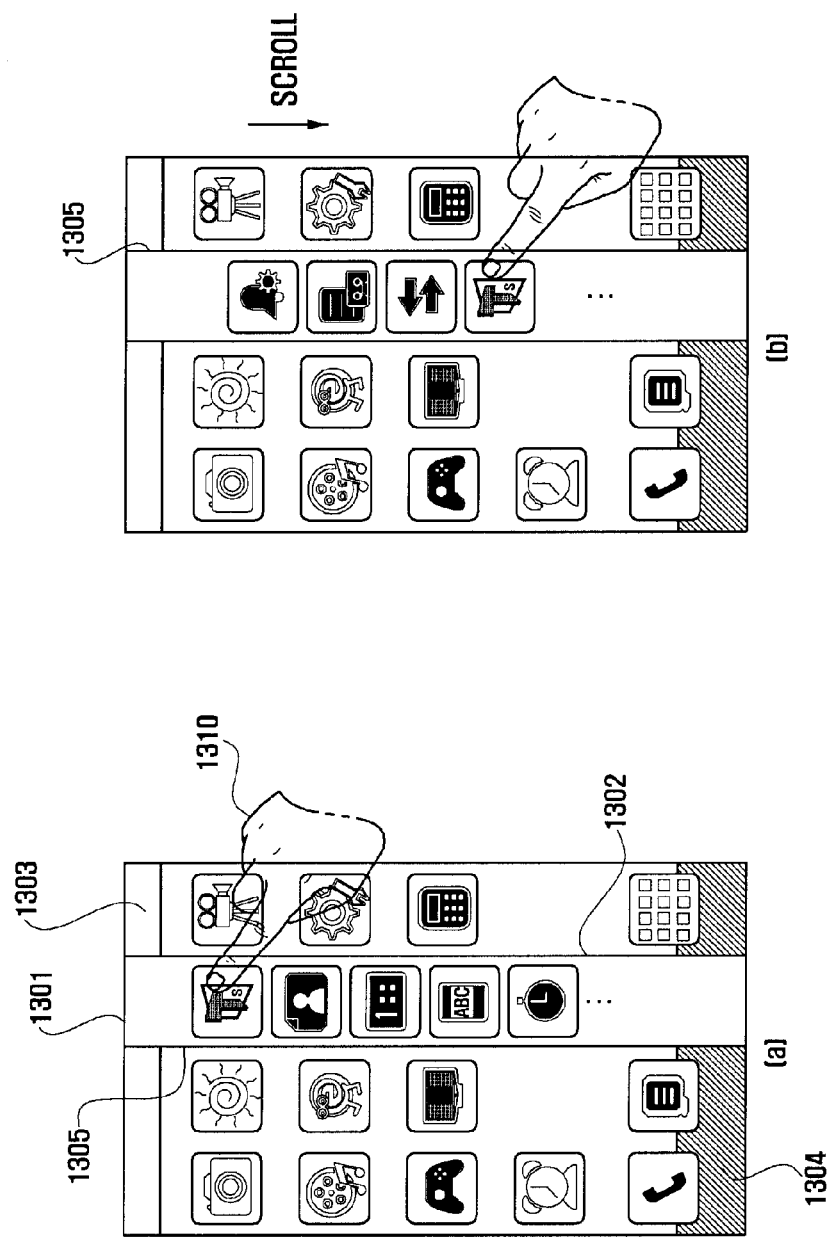
FIGS. 13A, 13B, 14A and 14B illustrate screens to describe a process when object items are expanded from the group and then scrolled.
Figure 14:
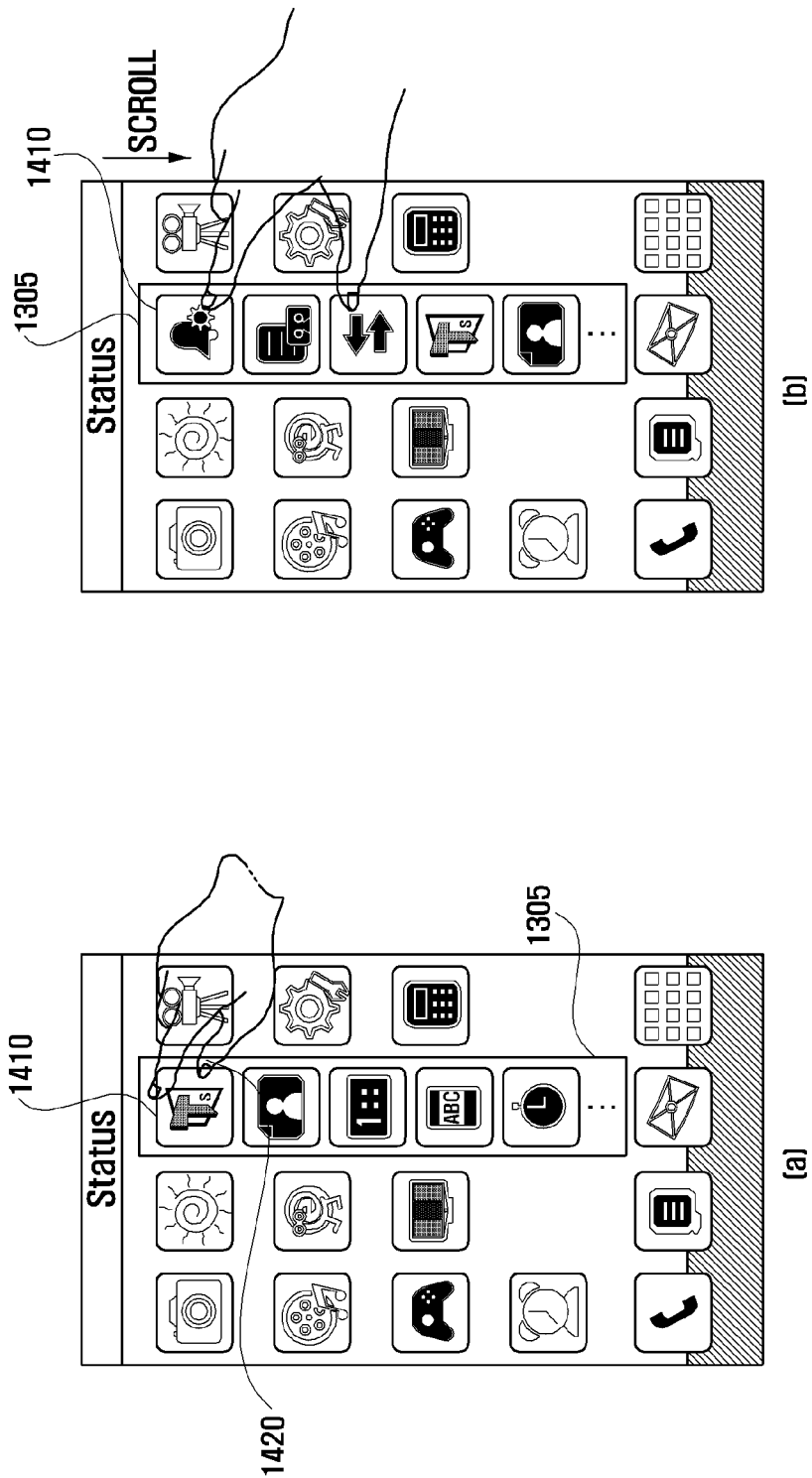

FIG. 9 is a flowchart that describes a method for expanding a group of object items at a certain degree of tilt and executing one of the object items. FIGS. 10 to 12 illustrate screens that are displayed according to step S935 of FIG. 9. FIGS. 13 and 14 illustrate screens that are displayed as part of a process wherein object items are expanded from the group and then scrolled.

As shown in FIG. 9, the controller 160 operates a screen displaying object items (S905). Examples of the object item display screen are a main screen, a home screen, etc., without limitation. The controller 160 displays at least one object item on a first screen (S910).

The controller 160 detects a user's input drag (S915). After that, the controller 160 determines whether the user's input drag is applied to an object item group or one of the object items (S920). If the controller 160 ascertains that the user's input drag is applied to one of the object items at step S920, it moves the dragged object item or performs another function (S925).

If the controller 160 ascertains that the user's input drag is applied to an object item group at step S920, it identifies at least two or more object items included in the dragged object item group (S930). After that, the controller 160 expands the object items respectively, at a second set interval. The expansion can be in the same direction as the drag direction and/or in the direction opposite to the drag direction (S935). During this process, the object items as successively arranged are expanded, while being attached, at a certain degree of tilt. That is, two adjacent object items are arranged in such a manner that the bottom surface of the upper object item contacts the upper surface of the lower object item. Such an arrangement manner is applied identically to a number of object items when they are arranged.

A detailed example of the step S935 operation is illustrated in combined FIGS. 10A, 10B, 11A, 11B, 12A and 12B. When the user touches a group of object items in a pile and then drags them as shown in FIG. 10A, the object items in the group are expanded, while still connected to each other and tilted at a certain degree as shown in FIG. 10B.

FIGS. 10A and 10B illustrate a case where the drag gesture is performed in the top direction of the screen, so the object items are expanded in the same direction as the drag direction.

FIG. 11A illustrates where the object item group is located at the top of the screen. In this case, the object item group cannot be dragged to the top of the screen. As shown in FIG. 11B, the user drags the group downwards. The object items in the group are therefore expanded in the same direction as the drag direction, i.e., downwards.

FIGS. 12A and 12B illustrate a case where object items in a group are simultaneously expanded both in the same direction as the drag direction and in the direction opposite to the drag direction. When the user touches a group of object items, as shown in FIG. 12A, and then drags them in the top direction of the screen, as shown in FIG. 12B, the object items are expanded both in the top and bottom direction with respect to the location where the group is located. The ratio of object items being expanded in the top direction to the bottom direction is as follows. It is assumed that, with respect to the location where the object item group is located, first and second distances are defined from the location to the top end and the bottom end of the screen, respectively. It is also assumed that the ratio of the first distance to the second distance is a:b. In that case, the ratio of object items moving in the upper direction to the lower direction is b:a. This allows object items to expand both in the upper and lower directions and arrive at both the top end and the bottom end at the same time from the location where the group is located.

Referring back to FIG. 9, the controller 160 determines whether the drag distance of the object item group exceeds a preset value (S940). To do so, the controller 160 compares the location where the object item group is located on the first screen with the dragged location and determines whether the distance between the locations exceeds a preset value.

If the controller 160 ascertains that the drag distance of the object item group exceeds a preset value at step S940, it enters a scroll mode (S945). The scroll mode refers to a mode where object items included in an object item group are arranged on a third screen, maintaining a certain interval or distance with respect to each other, and move in a certain direction in accordance with a user's scrolling gesture.

As shown in FIG. 13A, when the controller 160 operates a scroll mode, object items are arranged in a third screen 1305, maintaining a certain interval or distance with respect to each other. The third screen 1305 is displayed in such a manner that the top 1301 and the bottom 1302 can contact the top 1303 and the bottom 1304 of the display unit 132.

Referring back to FIG. 9, the controller 160 determines whether a user's scrolling gesture is performed (S950). When the controller 160 ascertains that a user's scrolling gesture is performed (at step S950), it scrolls the object items on the third screen in the scrolling direction (S955). Alternatively, if the controller 160 ascertains that a user's scrolling gesture is not performed (at step S950), it determines whether a termination instruction has been input (S960). When the controller 160 ascertains that a termination instruction has been input (at step S960), it terminates scrolling.

In an embodiment, the scrolling gesture is performed by two types of input, which are highlighted in FIGS. 13A, 3B, 14A and 14B.

When the controller 160 operates a scroll mode according to a user's drag, as shown in FIG. 13A, a scrolling gesture can be performed in a certain direction with respect to the dragged location, as shown in FIG. 13B. In this case, the object items in the third screen are scrolled in the scrolling direction.

FIGS. 14A and 14B illustrate a second example of the scrolling gesture according to the invention. After operating a scroll mode, the user can perform a scroll gesture 1420 for executing a scrolling function, regardless of a gesture 1410 for dragging an object item group. The scroll gesture 1420 is performed in a certain direction, as shown in FIG. 14B, so the object items in the third screen 1305 are scrolled in the scrolling direction (as shown).

Although it is not shown in FIG. 9, the controller 160 can sense a touch applied to an object item during the scroll mode. When sensing the touch, the controller 160 executes a function of the touched object item. For example, when the object item is an application, the application is launched (executed). When the object item is a folder, the files or sub folders, etc., in the folder are displayed.

As described above, the invention can form a number of object items selected by the user as a group of object items arranged by a first set interval, and display the object items on a screen of a mobile device. When a touch or a drag is made on a group of object items displayed at the first set interval, the object items are automatically displayed at a second set interval on the screen of the mobile device. Such inventive operation allows users to efficiently use the limited screen of the mobile device and to easily identify the contents of the folders, applications, etc., included in a group of object items.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A method for displaying screens on a touch screen of a mobile device, comprising:
    displaying, on a first screen, an object item group within which object items are arranged to be spaced apart by a first set interval, each object item being an application icon or a folder icon; and
    when an input to the object item group is detected, rearranging and displaying the object items included in the object item group on a second screen spaced apart by a second set interval,
    wherein when the detected input is a touch gesture, the object items are rearranged and displayed in a grid format, and when the detected input is a drag gesture different than the touch gesture, the object items are rearranged and displayed connected to one another according to a uniform tilt angle, and
    wherein in response to detecting further movement of the drag gesture in a first direction, the object item group expands while a uniform degree of tilt between each pair of object items is maintained, and the object item group expands in both the first direction and a second direction that is opposite the first direction, a distance of expansion in the first direction being proportional to a distance of expansion in the second direction.

2. The method of claim 1, further comprising creating the object item group by: detecting a selection of an object item displayed on a screen, the selection dragging and dropping the selected object item on a location where other object items are located or where the object item group is displayed; and
    generating the object item group by rearranging the selected object item and object items included in the object item group to be spaced apart by the first set interval.

3. The method of claim 2, wherein generating the object item group comprises:
    piling up at least two or more object items at the location.

4. The method of claim 1, wherein when the detected input is the touch gesture, rearranging and displaying the object items comprises:
    displaying the second screen;
    identifying object items in the object item group; and
    rearranging and displaying the identified object items on the second screen spaced apart by the second set interval.

5. The method of claim 4, wherein said rearranging and displaying the identified object items on the second screen spaced apart from each other at the second set interval comprises:
    moving the object items, piled up in the object item group on the first screen, to the second screen from a top to a bottom in order, and rearranging them in the grid format.

6. The method of claim 1, wherein the object item group is expanded such that object items of the object item group is connected to another object item of the object item group top-to-bottom while maintaining a uniform degree of tilt among the object items.

7. The method of claim 1, further comprising:
    when a drag distance of the drag input expanding the object item group exceeds a preset distance, executing scrolling of the object items in response to any drag gestures on the object item group.

8. The method of claim 7, wherein the object item group is displayed such that a top and bottom of the object item group contact a top and bottom of a display unit of the mobile device respectively.

9. A mobile device for displaying items and rearranging displayed items within screens on a touch screen, comprising:
    at least one processor, configured to:
    display, on a first screen, an object item group within which object items are spaced apart by a first set interval, each object item being an application icon or a folder icon; and
    when an input to the object item group is detected, rearrange and display the object items included in the object item group on a second screen spaced apart by a second set interval, wherein when the detected input is a touch gesture, the object items are rearranged and displayed in a grid format, and when the detected input is a drag gesture different than the touch gesture, the object items are rearranged and displayed connected to one another according to a uniform tilt angle, and wherein the at least one processor is further configured to expand the object item group both in a first direction and a second direction that is opposite to the first direction, a distance of expansion in the first direction being proportional to a distance of expansion in the second direction.

10. The mobile device of claim 9, wherein the at least one processor is further configured to:
  detect a selection of an object item, the selection dragging and dropping the selected object item on a location where object items other than the selected object item or an object item group is displayed; and
  generate the object item group by rearranging the selected object item, and the object items included in the object item group to be spaced apart by the first set interval.

11. The mobile device of claim 10, wherein the at least one processor is further configured to generates the object item group by piling up at least two or more object items at the location.

12. The mobile device of claim 9, wherein the at least one processor is further configured to:
  when the detected input is the touch gesture;
  display the second screen;
  identify object items in the object item group; and
  rearrange and displays the identified object items in the object item group on the second screen spaced apart by the second set interval.

13. The mobile device of claim 12, wherein the at least one processor is further configured to:
  move the object items piled up in the object item group on the first screen to the second screen from a top to a bottom in order; and
  rearrange the moved object items in the grid format.

14. The mobile device of claim 9, wherein, in response to detecting continued movement of the drag gesture, the at least one processor is further configured to expand the object item group while maintaining a uniform degree of tilt between each pair of object items.

15. The mobile device of claim 14, wherein when a drag distance of the drag gesture expanding the object item group exceeds a preset distance, scrolling the object items is executed in response to any drag gestures on the object item group.

16. The mobile device of claim 15, wherein the object item group is displayed such that a top and bottom of the object item group screen contact a top and bottom of a display unit of the mobile device respectively.

17. The mobile device of claim 9, wherein the object item group is expanded such that object items of the object item group is connected to another object item of the object item group top-to-bottom while maintaining a uniform degree of tilt among the object items.

\* \* \* \* \*